United States Patent [19]

Wójtowicz

[11] Patent Number: 5,665,809
[45] Date of Patent: Sep. 9, 1997

[54] EXTRUDED SILICONE GEL PROFILES

[75] Inventor: Janusz Wójtowicz, Palo Alto, Calif.

[73] Assignee: Raychem Corporation, Menlo Park, Calif.

[21] Appl. No.: 749,601

[22] Filed: Dec. 2, 1996

Related U.S. Application Data

[63] Continuation of Ser. No. 522,650, Sep. 1, 1995, abandoned.

[51] Int. Cl.⁶ ........................................... C08K 3/10
[52] U.S. Cl. ..................... 524/439; 524/588; 521/60; 528/10; 264/178 R; 264/236
[58] Field of Search ..................... 524/439, 588; 521/60; 528/10; 264/178 R, 236

[56] References Cited

U.S. PATENT DOCUMENTS

| | | | |
|---|---|---|---|
| 3,020,260 | 2/1962 | Nelson | 260/46.5 |
| 3,143,475 | 8/1964 | Koff et al. | 167/81 |
| 3,242,237 | 3/1966 | Belak et al. | 264/13 |
| 3,437,488 | 4/1969 | Humphreys | 99/3 |
| 3,504,061 | 3/1970 | Elliot | 264/9 |
| 3,663,666 | 5/1972 | Vincent et al. | 264/13 |
| 3,960,804 | 6/1976 | Minute | 260/37 SB |
| 4,408,011 | 10/1983 | Barnabeo | 525/100 |
| 4,517,238 | 5/1985 | Mine et al. | 428/212 |
| 4,559,319 | 12/1985 | Kurita et al. | 502/156 |
| 4,565,725 | 1/1986 | Spamer et al. | 428/167 |
| 4,585,830 | 4/1986 | Sweet | 524/862 |
| 4,600,261 | 7/1986 | Debbaut | 339/116 C |
| 4,634,207 | 1/1987 | Debbaut | 339/116 C |
| 4,749,765 | 6/1988 | Shimizu et al. | 528/15 |
| 4,777,063 | 10/1988 | Dubrow et al. | 427/44 |
| 4,783,289 | 11/1988 | Shimizu et al. | 264/28 |
| 4,824,616 | 4/1989 | Shimizu et al. | 264/7 |
| 4,852,646 | 8/1989 | Dittmer et al. | 165/185 |
| 4,865,905 | 9/1989 | Uken | 428/220 |
| 4,927,587 | 5/1990 | Takahashi et al. | 264/211 |
| 5,079,300 | 1/1992 | Dubrow et al. | 525/106 |
| 5,124,090 | 6/1992 | Shimizu et al. | 264/13 |
| 5,140,746 | 8/1992 | Debbaut | 29/855 |
| 5,257,058 | 10/1993 | Mabuchi | 354/286 |
| 5,324,564 | 6/1994 | Chiotis et al. | 428/124 |
| 5,357,057 | 10/1994 | Debbaut | 174/84 R |
| 5,401,781 | 3/1995 | Hagen | 523/213 |
| 5,508,334 | 4/1996 | Chen | 524/474 |

FOREIGN PATENT DOCUMENTS

| | | | |
|---|---|---|---|
| 0 096 790 | 12/1983 | European Pat. Off. | |
| 0 241 207 | 10/1987 | European Pat. Off. | |
| 0 241 207 A2 | 10/1987 | European Pat. Off. | C08J 5/18 |
| 0 324 411 A3 | 7/1989 | European Pat. Off. | C08J 3/12 |
| 0 324 411 B1 | 7/1989 | European Pat. Off. | C08J 3/12 |
| 0 241 207 B1 | 3/1991 | European Pat. Off. | C08J 5/18 |
| 0 373 559 B1 | 7/1994 | European Pat. Off. | C08J 3/12 |
| 0 664 312 A1 | 7/1995 | European Pat. Off. | |
| 61-223032 | 10/1986 | Japan | C08J 3/12 |
| 906139 | 9/1952 | United Kingdom | |

OTHER PUBLICATIONS

Derwent Abstract No. 93-393387 [49] (abstract of JP 05-081438 (Suzuki Sogyo KK (1993))).
Patent Abstracts of Japan, vol. 14, No. 140 (M-0950), Mar. 1990 (abstract of JP 02-006109 (Toray Silicone).
General Electric brochure entitled "GE Silicones" (Jul. 1990).
Dow Corning brochure entitled "Information About High Technology Silicone Materials" (1991).
ASTM D 4283-83 (Reapproved 1988), p. 459.
SYLGARD®527 prmerless silicone dielectric gel Dow Corning Corp. 1980.
GE 6186 Silicones MSDS Apr. 16, 1991.
GE Silicones RTV 6156; 6166; 6186; and 6196 SDS 4518 (Sep. 1989).

*Primary Examiner*—Melvyn I. Marquis
*Attorney, Agent, or Firm*—Herbert G. Burkard; Yuan Chao

[57] ABSTRACT

The invention provides for a method of making simple or complex extruded gel profiles and the created article. In a particularly preferred embodiment, the method involves the extrusion of a silicone gel composition through a die into a heated fluid to complete the cure of the gel as well as to produce the desired gel profile shape. Shapes such as stars, trapezoids, cusped squares, cusped triangle, triangles and the like can be fabricated according to the method.

32 Claims, 3 Drawing Sheets where $R_1, R_2, R_3$, or $R_4$, is a radius which can be equal or different

EXTRUDED SILICONE GEL PROFILES

CROSS-REFERENCE TO RELATED APPLICATIONS

This application is a continuation of application Ser. No. 08/522,650 filed Sep. 1, 1995, now abandoned, the disclosure of which is incorporated herein by reference.

TECHNICAL FIELD OF THE INVENTION

This invention relates to the extrusion of silicone-containing shaped article(s). In particular, this invention relates to a method of extruding simple or complex shaped soft silicone gel article(s) and the shaped articles.

BACKGROUND OF THE INVENTION

Silicone based materials run the gamut from liquids such as silicone oils to hard Shore A durometer rated silicone rubbers, e.g. silicone gaskets. Towards the softer end of this spectrum are materials known as silicone gels which are below the measurment range of the Shore A durometer, but may be characterized by cone penetration (ASTM D217) or by Voland hardness. These systems can be formed in a number of ways. One method synthesizes the crosslinked polymer in the presence of an extender fluid, e.g. a non-reactive silicone oil, or an excess of a vinyl rich liquid silicone compound to create a soft fluid-extended system. Silicone gels generally have Voland hardness of about 1 to 25 grams and elongations greater than 300% and often substantially greater than 500%, e.g. greater than 1000%. Alternatively, silicone gel systems can be fabricated from mixtures of vinyl-containing polysiloxanes and hydride-containing polysiloxanes such that the final product has the appropriate hardness, elongation and tensile properties characteristic of a silicone gel. Suitable examples of both types of gels are taught in, inter alia, U.S. Pat. Nos. 4,600,261; 4,634,207; 5,140,746; 5,357,057; 5,079,300; 4,777,063; 5,257,058; 3,020,260; and Sylgard 527. Each of the preceding patents are completely incorporated herein by reference for all purposes.

U.S. Pat. No. 4,824,616 teaches making elastomer-skinned silicone gel particles by a two-step process involving (a) delivery of a silicone based material through a nozzle kept at very low temperature into a heated water bath optionally including a surfactant, and (b) forming an elastomeric layer on the surface of the silicone. gel particle. In particular, U.S. Pat. No. 4,824,616 mentions but does not exemplify that it is possible to crosslink the surface of a silicone gel particle bypassing it through a solution of organohydrogenpolysiloxane in a heat transfer medium, such as a silicone fluid. U.S. Pat. No. 5,124,090 teaches making silicone gel spheres by the delivery of a silicone based material through a nozzle, kept at very low temperature, into a heated water bath optionally including a surfactant.

The need to maintain a low viscosity of the mixed precursor materials in U.S. Pat. No. 4,824,616 and U.S. Pat. No. 5,124,090 requires mixing. and storage temperatures of −60° C. to +5° C. and preferably −10° C. However, no teaching is given which indicates that angular complex shapes, as opposed to simple filament-like shapes, can be extruded. Neither of the above mentioned patents teaches the benefits of utilizing a higher temperature heat transfer medium, e.g. silicone oil, which enhances the processability and the rate of article formation. Most notably absent in the patent is the appreciation and the benefits of handling tacky gels through the use of a heated silicone oil bath, as well as examples on how to effectively use such a medium. Additionally, there is no recognition of the need for higher viscosities to create complex extruded shapes or how to achieve higher viscosities through the use of accelerators such as a catalyst and/or an increase in the reaction temperature, or the addition of fillers, or combinations thereof.

U.S. Pat. No. 4,783,289 teaches a process for the molding of silicone rubber compositions. Whereas the hardness of the products of the present invention is below the measurement limits of the Type A Shore Durometer, the hardness of the products described in U.S. Pat. No. 4,783,289 is readily measurable using such an apparatus. The tensile strength of the products exemplified in U.S. Pat. No. 4,783,289 ranges between 560–1420 psi and the elongation-to-break of the products range between 60–700%. The elongation of an article described in U.S. Pat. No. 4,783,289 increases with tensile strength. For example, an article with a tensile strength of 560 psi exhibits 60% elongation, whereas an article with a tensile strength of 1420 psi exhibits 600% elongation. By contrast, the products of the present invention exhibit tensile strength less than 20 psi, preferably less than 10 psi and most preferably less than 5psi and and elongation-to-break greater than 300% and often substantially greater than 500%, e.g. greater than 1000% even at tensile strengths less than 5 psi. In general, the products of the present invention are mechanically less robust than those described in U.S. Pat. No. 4,783,289. Forming substantially continuous shaped articles from such delicate materials of the present invention presents unique problems.

Thus, it would be highly desirable to have a method, and the articles fabricated therefrom, which can create simple, or complex, shapes at a rate and on a continuous basis for low cost commercial operations. In addition, it would be desirable to use a heated fluid, e.g. a silicone oil bath, to permit optimization of the surface properties of the gel product. Addition of additives to the heat transfer medium would also permit one to tailor the surface properties of the final article, for example by an optional final skinning operation, and the like.

SUMMARY OF THE INVENTION

The invention circumscribes a method, and the articles derived therefrom, of fabricating soft silicone gel forms. The invention provides for a method of making simple or complex extruded gel profiles and the created article. In a particularly preferred embodiment, the method involves the extrusion of a silicone gel composition through a die into a heated fluid to complete the cure of the gel as well to produce the desired shaped article. The mixture viscosity and cure rate, die length and temperature, and the speed of extrusion are adjusted so that the extruded article substantially assumes the die shape. Preferred viscosity at the die exit is at least 2000 cSt and the die temperature is greater than 25° C. If a lower viscosity mixture is used, then premixing and/or preheating of the mixture and/or gel precursors needs to take place before extrusion. Consequently, higher viscosity precursors and faster material cure rates permit higher throughputs. The method involves extruding a viscous silicone gel composition through a suitably shaped die into a heated medium, e.g. silicone oil, at a temperature in excess of about 85° C. Optionally the heat transfer medium can contain other additives such as benzophenone, additional reactive precursors, colorants, fillers and the like to permit further processing of the extruded form. The time within the heated fluid bath is adjusted such that a handleable form is extracted from the bath. A particular embodiment involves circulation of the heat transfer medium. Finally, the invention involves using cure rate accelerators which permit utilization of normally low viscosity, slow curing silicone systems such as those found in U.S. Pat. Nos. 4,783,289; 4,824,616; and 5,124,090 the disclosures of which are incorporated herein by reference for all purposes.

DESCRIPTION OF THE PREFERED EMBODIMENTS

Figure 1:
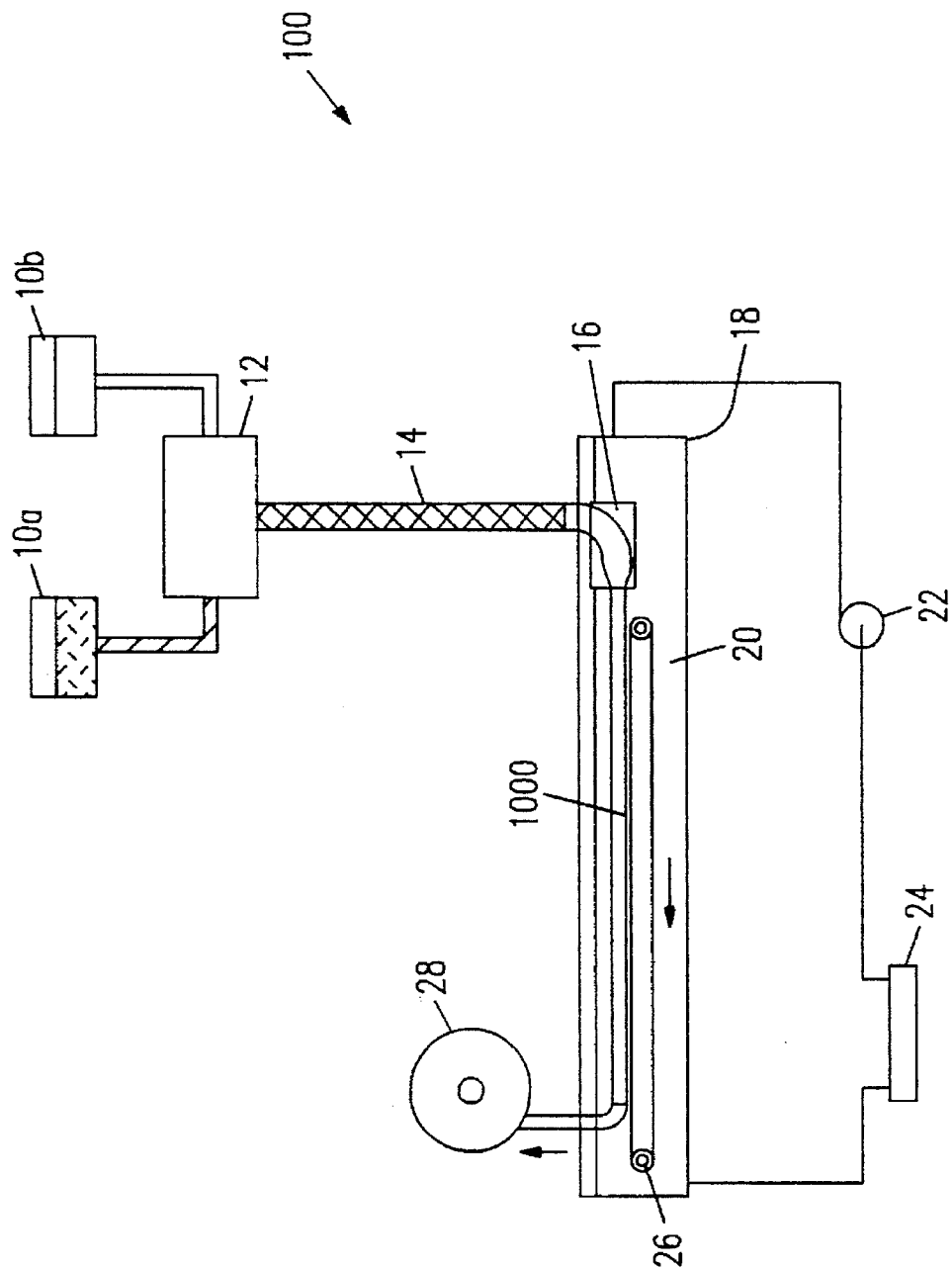
FIG. 1 illustrates an embodiment of the method for carrying out the invention utilizing a laminar flow of silicone oil and a static mixer.

The invention will now be described with respect to the particularly preferred embodiments. The method involves using a silicone gel material as described in U.S. Pat. Nos. 4,600,261; 5,079,300; 3,020,260 (plus accelerator); U.S. Pat. No. 4,783,289 (plus accelerator); U.S. Pat. No. 5,124,090 (plus accelerator), the disclosures of which are hereby incorporated by reference for all purposes.

The preferred silicone gel materials are mixtures of unsaturated silicones such as a polyvinyl-containing silicones with hydride-rich silicones curable in the presence of a catalyst to create the extruded, crosslinked silicone gel forms of the invention. The silicone gel materials include mixtures of (a) $(R^1R^2{}_2SiO_{0.5})(R^1R^2SiO)_a(R^2{}_2SiO)_b(R^1R^2{}_2SiO_{0.5})$ (I), $(R^2{}_3SiO_{0.5})(R^1R^2SiO)_c(R^2{}_2SiO)_d(R^2{}_3SiO_{0.5})$ (II), or combinations of I and II, in which $R^1$ is selected from the group vinyl, allyl, hexenyl and the like, $R^2$ is selected from the group methyl, ethyl and higher alkyl, 3,3,3-trifluoropropyl, or phenyl and combinations thereof, (b) $(R^3R^2{}_2SiO_{0.5})(R^3R^2SiO)_e$ $(R^2{}_2SiO)_f(R^3R^2{}_2SiO_{0.5})$ (III), $(R^2{}_3SiO_{0.5})(R^3R^2SiO)_g(R^2{}_2SiO)_h(R^2{}_3SiO_{0.5})$ (IV), $(R^3R^2{}_2SiO_{0.5})_4SiO_2$ (V) or combinations thereof, in which $R^3$ is hydrogen and $R^2$ is selected from the group described above. The subscripts a–h in compounds I–V are chosen such that the cured silicone gel material, with or without the addition of inert fluid(s), exhibits a Voland hardness of 6–225 grams, Voland tack of about 1–75 grams and Voland stress relaxation of about 10–95%.

Preferably the silicone gel materials consist of an admixture of a multiply vinyl-functionalized poly (dimethylsiloxane) having a viscosity between about 10,000 and about 500,000 cSt with a hydride-functionalized silicone species having a molecular weight between about 300 to about 60,000 and about 3 to about 20, and preferably 3 to 6 reactive hydride sites per molecule, a suitable catalyst such-as a platinum vinyl-terminated polymethylsiloxane complex and a non-functionalized trimethylsiloxy-terminated poly(dimethylsiloxane) (hereafter referred to as extender fluid) with a viscosity of from about 25 cSt to about 250,000 cSt.

There is an interaction between the catalyst level, viscosity and temperature of the mix as well as the temperature of the extrusion head and the heated bath, but the viscosity of the material at the extrusion head should be greater than about 2,000 cSt, preferably greater than about 10,000 cSt, and up to just below a viscosity that cannot be extruded through the die and substantially take the shape of the die.

More specifically preferred components of the material will utilize a trimethylsiloxy-terminated poly (dimethylsiloxane) as a diluent in the amount of from about 0 to 90 wt %. The diluent preferably has a viscosity of between 25 and 250,000 cSt, preferably between about 50 and about 100,000 cSt. The active vinyl-containing silicone is a divinyl-terminated poly(dimethylsiloxane) (compound I in which $R^1$=vinyl, $R^2$=methyl and a=0) having a viscosity of from about 10,000 to about 500,000 cSt and is present in the amount from about 99 to about 10 wt %. About 3 to about 1000 ppm platinum catalyst is utilized, and depending upon the cure rate, an inhibitor of from 0 to 250 parts is utilized. A multi-functional hydride-containing silicone (e.g. compounds III–V) of from about 0.08 wt % to about 0.1 wt % is added to provide a gel material having Voland hardness of about 6–225 grams, Voland tack of about 1–75 grams and Voland stress relaxation of about 10–95%.

More preferably, the non-filled silicone gel material consists of a divinyl-terminated poly(dimethylsiloxane) having a viscosity of from about 50,000 to 175,000 cSt and is present in about 30 to 70 wt % in a diluent whose viscosity is from about 40 to 12,500 cSt and is present from about 70 to 30 wt %. The platinum catalyst is from about 5 to 100 ppm with an inhibitor of from about 0 to 100 ppm and tetra functional hydride-containing silicone (e.g. compound V) in the amount of from about 0.085 wt % to 0.095 wt % to provide a gel material having Voland hardness of about 8–180 grams, Voland tack of about 2–70 grams and Voland stress relaxation of greater than-about 10%.

A particularly preferred silicone gel composition consists of about 45 wt % divinyl-terminated poly(dimethylsiloxane) having,viscosity of from about 72,000 to about 90,000 cSt, a trimethylsiloxy-terminated poly(dimethylsiloxane) diluent having a viscosity of from about 50 to about 5,000 cSt and present in the amount of about 55 wt %, about 10 ppm platinum catalyst and about 0.09 wt % tetrafunctional hydride-containing silicone (e.g. compound V in which $R^3$=hydrogen and $R^2$=methyl). This particularly preferred material produces an extruded gel article having a Voland profile hardness (VPH) of about 40–80 grams, Voland profile tack (VPT) of about 5–50 grams and Voland profile stress relaxation (VPSR) of about greater than 10%.

In a particularly preferred embodiment the reactivities of the vinyl and hydride-containing silicones are selected such that the crossover point, as measured using a parallel plate rheometer, occurs between 60 seconds and several hours. The crossover point is the time, following introduction of the precured gel composition into the rheometer, at which the elastic modulus, G', becomes equal to the loss modulus, G". In many cases the crossover point is reached almost instantaneously, i.e. in several seconds or less, at temperatures greater than about 80° C.

The formulation is preferably originally fabricated to be able to absorb compatible fluids. Upon extruding the gel composition into a silicone oil bath at elevated temperature the extruded product adsorbs silicone oil rendering the article easy to handle. Upon standing, the surface-bound silicone oil is absorbed into the final article thereby revealing a tacky sealing surface.

The hardness of the gel in the bulk, or as profile, can vary from about 6 to about 225 grams with a tack in the bulk, or as profile, greater than about 1 gram to less than about 75 grams, preferably about 5 to about 45 grams, and exhibits elongation substantially greater than 200%, preferably greater than 500% with stress relaxation of greater than 10%. A preferred range of hardness in the bulk, or as profile, is from about 6 grams to about 180 grams, a tack of from about 10 grams to about 35 grams. Additionally, the elongation of the gel is greater than about 200% and preferably greater than about 400%, most preferably greater than about 750%. The elongation is measured according to the procedures of ASTM D638.

The extrusions of this invention find use as profiles to provide a method of sealing between two objects for example between the body of a head lamp and the head lamp lens, a cover and a box, pipes, flat plates, and the like. The conformability and high elongation of the extruded materials permit the facile sealing of delicate three dimensional surfaces which cannot be done with harder silicone rubbers whose hardness can be measured using a Shore A durometer.

Figure 4C:
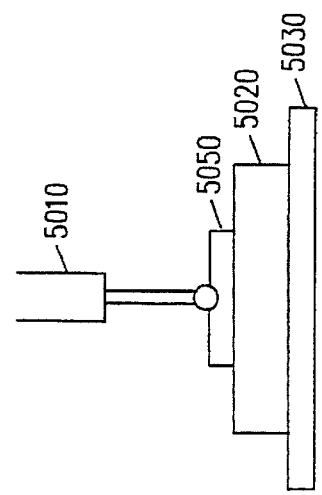
FIGS. 4a, 4b and 4c illustrate the test procedure for determining VPH, VPSR and VPT of an extruded gel article.
Figure 4B:
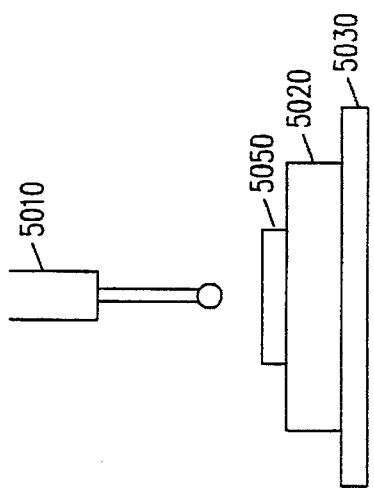
Figure 4A:
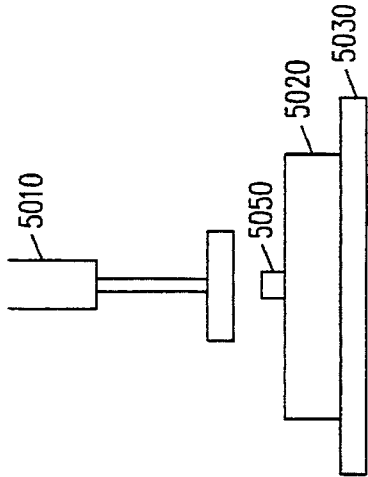

The actual extruded silicone gel article of the present invention is readily characterized in the following manner using a Voland-Stevens texture analyzer model LFRA, Texture Technologies Texture Analyzer TA-XT2, or like machine (FIGS. 4a–c), with a five kilogram load cell to measure force, a 0.5 gram trigger, and a polished cylindrical probe 5010 (¼ inch diameter×1 inch in length), whose axis is parallel to the base 5030 of the analyzer. A specimen of the extruded gel profile 5050, preferably with a square cross-section (5 mm×5 mm) and 5 cm long, is placed on the holder 5020 illustrated in FIG. 4. The holder and specimen is placed beneath the probe of the Texture Analyzer so that the axis of the cylindrical probe is perpendicular to the axis of the specimen. The probe is lowered towards the profile at a rate of 2 mm/sec. When the trigger point, 0.5 gram, is exceeded the probe is depressed 2 mm further into the test specimen and the resulting force ($F_i'$, Voland Profile Hardness also referred to hereafter as VPH) is recorded. The probe is then maintained at that depth for 60 sec at which point the force remaining on the probe is recorded ($F_f'$). The Voland Profile Stress Relaxation (VPSR) is calculated as $[(F_i'-F_f')/F_i']\times 100\%$. Then the probe is raised at a rate of 2 mm/sec and the force required to disbond the probe from the specimen is recorded as the Voland Profile Tack (VPT). The ratio of VPT/VPH is useful in characterizing the articles of the present invention. Ratios of VPT/VPH greater than zero to about 20 and preferably, about 0.01 to about 15.0, and most preferably about 0.10 to about 10.0 exemplify preferred materials of the invention. When measured according to this technique, the extruded gel profiles have hardness of from about 1 g to about 150 g, preferably about 5 g to about 100 g and-most preferably 15 to 80 g.

Voland profile tack ranges measured on an article of the present invention are similar to the Voland tack ranges measured on the bulk silicone materials measured as described below.

An article prepared as described in Example 1 exhibits VPH of 47.5 grams, VPT of 23.6 g and VPSR of 32%. For this article the ratio of VPT/VPH is 0.49. An article produced as described in Example 2 exhibits VPH of 79.1 g, VPT of 11 g, and VPSR of 17% and a ratio of VPT/VPH of 0.14.

As a comparison, the measurements for a soft silicone rubber (identified as 30.126, HiTech Rubber) exhibits VPH of 1890 g, VPT of 0 g, VPSR of 17%, and a ratio of VPT/VPH of 0; soft silicone rubber (identified as 6030, HiTech Rubber) exhibits VPH of 1912 g, VPT of 0 g, VPSR of 15% and a ratio of VPT/VPH of 0; and soft silicone rubber (identified as 1949-20, HiTech Rubber) exhibits VPH of 2110 g, VPT of 0 g, VPSR of 17%, and a ratio of VPT/VPH of 0. These silicone rubbers are products of the HiTech Rubber Company, Orange County, Calif.

Alternately, the Voland hardness, stress relaxation, and tack of the bulk silicone gel materials of the present invention can be measured using a Voland-Stevens Stevens texture analyzer model LFRA, Texture Technologies Texture Analyzer TA-XT2, or like machines, having a five kilogram load cell to measure force, a 5 gram trigger, and a ¼ inch diameter, preferably stainless steel, (6.35 mm) ball probe as described in U.S. Pat. No. 5,079,300, the disclosure of which is completely incorporated herein by reference for all purposes. For example, for measuring the Voland hardness of a gel, a 20 mL glass vial with about 13 grams of gel is placed in the Texture Technologies Texture Analyzer and the ball probe is forced into the gel at the speed of 0.2 mm/sec to a penetration distance of 4.0 mm. The data from the Texture Technologies Texture Analyzer TA-XT2 is analyzed on an IBM PC, or like computer, running Microsystems Ltd. XT.RA Dimension Version 2.3 software. The Voland hardness of the gel is the force in grams, recorded by the XT.RA software, required to force the ball probe at that speed to penetrate or deform the surface of the gel specified for 4.0 mm. Higher numbers signify harder gels.

The tack and stress relaxation are read from the stress curve generated when the XT.RA Dimension Version 2.3 software automatically traces the force versus time curve experienced by the load cell when the penetration speed is 2.0 mm/sec and the stainless steel ball probe is forced into the gel a penetration distance of about 4.0 mm. Thereafter, the stainless steel probe is held at 4.0 mm penetration for 1 minute and withdrawn at a speed of 2.0 mm/sec. The stress relaxation is the ratio of the initial force (Fi) resisting the probe at the pre-set penetration depth minus the force resisting the probe (Ff) after 1 min divided by Fi expressed as a percentage. Specifically, stress relaxation as a percent is equal to $[(F_i-F_f)/F_i]\times 100$ where $F_i$ and $F_f$ are in grams. In other words the stress relaxation is the ratio of the initial force minus the force after 1 minute divided by the initial force. The stress relaxation number is a measure of the ability of the gel to relax any induced compression placed on the gel. The tack is the amount of force in grams resisting the probe as it is pulled out of the gel after the one minute at a speed of 2.0 mm/sec from the preset penetration depth.

Another alternative way to characterize the gels is by cone penetration parameters according to ASTM D-217 as taught in U.S. Pat. Nos. 4,600,261; 4,634,207; 5,140,746; and U.S. Pat. No. 5,357,057 each patent completely incorporated herein by reference for all purposes. Cone penetration (CP) ranges are from about 70 ($10^{-1}$ mm) to about 400 ($10^{-1}$ mm). Harder gels are preferably from about 70 ($10^{-1}$ mm) to about 120 ($10^{-1}$ mm). Softer gels, preferably used to seal terminals, wire splices, and the like, are from about 200 ($10^{-1}$ mm) to 400 ($10^{-1}$ mm) with a particularly preferred range of from about 250 ($10^{-1}$ mm) to about 375 ($10^{-1}$ mm). For a particular materials system a relationship between CP and Voland gram hardness can be developed as taught in U.S. Pat. No. 4,852,646, completely incorporated herein by reference for all purposes.

Figure 2:
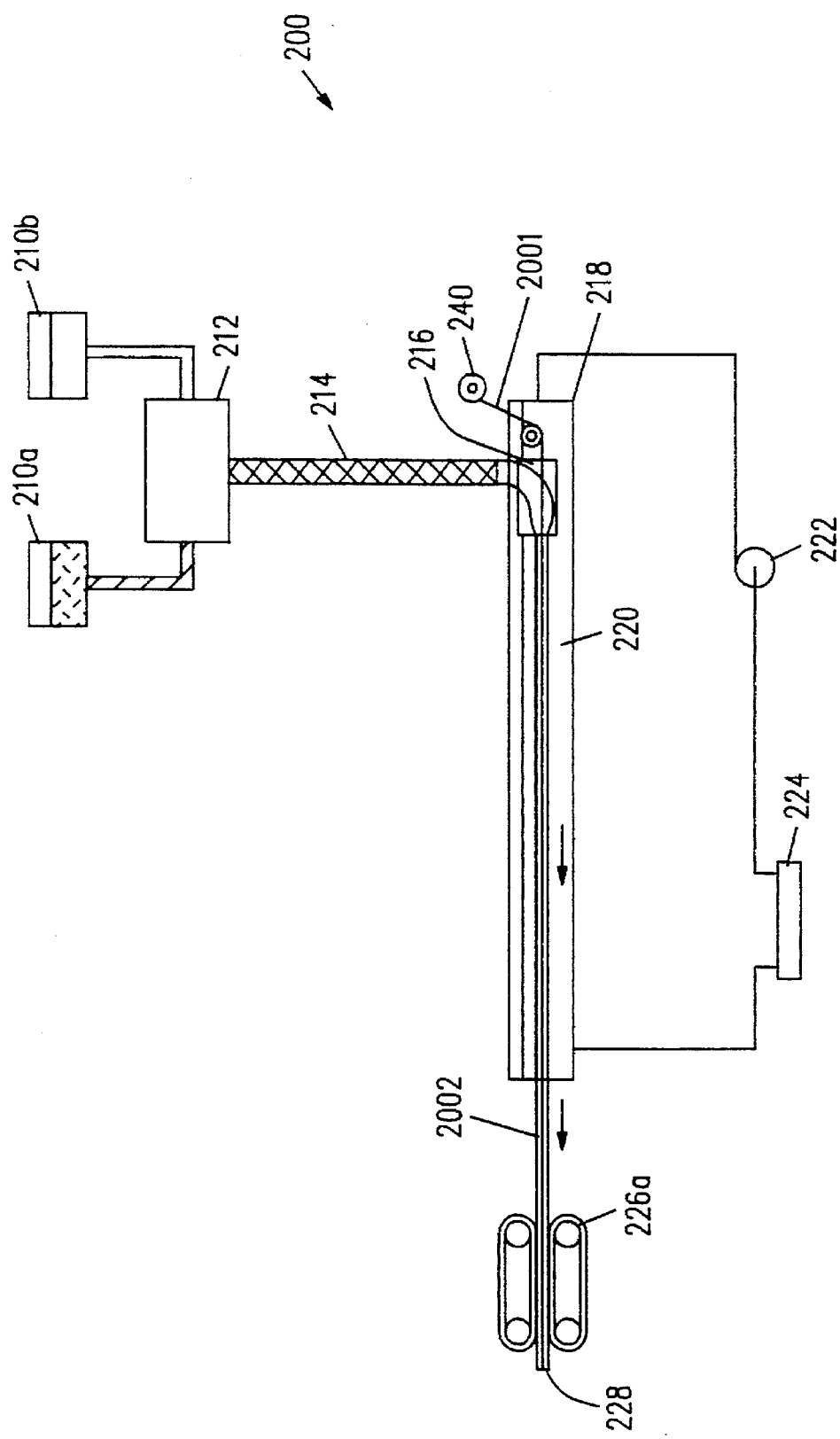
FIG. 2 illustrates an alternative embodiment of the method of the invention optionally including the extrusion around a solid carrier.
Figure 3:
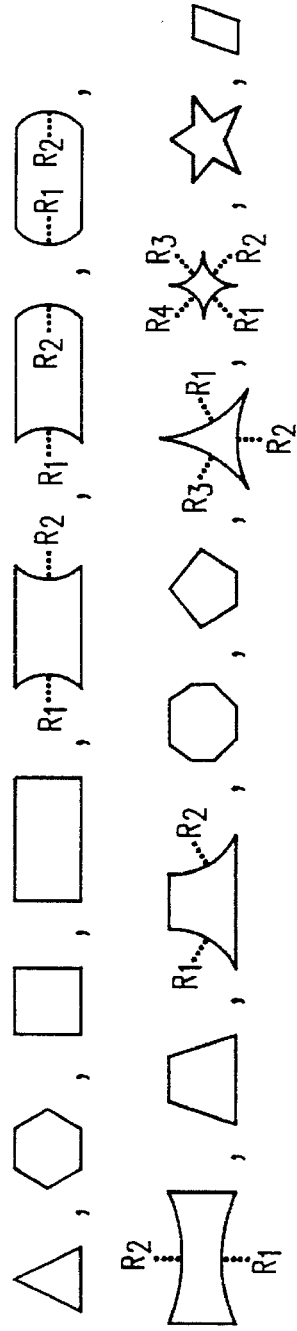
FIG. 3, illustrates particularly preferred cross sections for the extruded gel of FIGS. 1 and 2.

The process is illustrated in FIGS. 1 and 2 and comprises mixing the components in a static mixer and forcing them through a die to create a preferred shape such as a circular cross section, triangular cross section, cusped square cross section, trapezoidal, star and the like with the material being injected into a heat transfer medium, e.g. a silicone oil, maintained at from about 80° C. to about 175° C., preferably about 140° C. Particularly preferred shapes are illustrated in FIG. 3. An advantage of this method is the fact that the mixture cures very rapidly, i.e. in a few seconds, or less, in the heated oil bath while providing acceptable pot life in the static mixer. When the heat transfer medium is a lower boiling point liquid such as water, the throughput is lower and the mixture of A and B must have higher viscosity in the die to substantially assume the die shape. This can be achieved by preheating gel precursors before mixing, mixing gel constituents prior to extruding, addition of an appropriate filler, or a combination thereof:

More specifically with respect to the process/method of the invention, particular reference is made to FIG. 1. The apparatus is illustrated as 100. The apparatus includes a source 10a for part A, such as that containing the vinyl-containing silicone species and the platinum catalyst, and a source 10b for Part B, such as that containing the vinyl-containing silicone species, the inhibitor and the crosslinker, e.g. compound V. These materials are pumped via a dispensing system 12 into a mixing element 14, such as a static mixer, which completely intermixes the parts A and B. Thereafter the viscosity of the mixture increases as it moves through the mixing element 14 and is forced through a die 16 having the desired shape necessary to produce the desired final extruded silicone profile 1,000. The die is at least partially and preferably completely contained in container 18, as illustrated, which includes the heat transfer fluid, e.g. silicone oil, 20 preferably flowing in the direction indicated by the arrow using pump 22. The silicone oil preferably circulates substantially parallel with the extruded profile. In some cases the silicone oil may flow counter current, or perpendicular to the extrusion direction of the gel profile. The temperature of the heated silicone oil 20 is adjusted by having the circulation heater 24 in series with the pump and the oil bath container 18. A transfer belt assembly 26 assists in moving the extruded silicone gel form 1,000 out of the die and through the heated silicone oil. The profile is then taken up on spool 28. The time in the heat transfer fluid is sufficient to substantially complete the curing process so that the gel form substantially assumes the die shape. Suitable times are from three seconds to five minutes or more and preferably about five seconds to two minutes.

An alternative body is illustrated as 200 in FIG. 2. Items carried over from FIG. 1 which are the same are numbered identically except for the inclusion of the 200s digit in front of the elements. This embodiment differs in that the extruded form 2002 is extruded through the die 216 which has passing therethrough a solid carrier 2001 removed from a carrier spool 240. Preferably the carrier is a substantially non-elongatable core member selected from the group consisting of polymer fiber(s), glass fiber(s), fiber glass, carbon fiber(s), metallic fiber(s), ceramic fiber(s), porous polymeric carriers and combinations or mixtures thereof. In addition, the carrier may be comprised of bundles of fibers. In this embodiment the gel is drawn from the bath using caterpillar puller 226a and hence taken up on a take-up spool. The substantially non-elongatable core member provides a anchoring site for the silicone gel and permits faster pull speeds as well as a means to preclude the silicone gel form from being stretched beyond its elongation limits and thus breaking. Preferably, the core member is from about one half percent to about 99% of the cross-sectional area of the extruded gel form.

Samples having nominal diameters across the shape at the narrowest point of from about 0.2 mm up to about 20 mm or greater can be created by the method. To maintain an adequate pull speed of about 1 cm/sec., to about 150 cm/sec, preferably about 5 cm/sec to 75 cm/sec, the oil bath temperature should be increased as the cross sectional size of the material increases to effect a faster cure rate of the system as a whole. A particularly preferred method involves the static mixing and dispensing of the gel through a suitable die into a silicone oil.

The oil is preferably heated to a temperature in excess of 100° C. and preferably between 100° C. and 200° C. or just below the diluent oil's flash point. A particularly preferred range is about 125° C. to about 175° C. Of course, the optimum temperature is a function of the reactants and their reactivity, the cross sectional area of the extruded part and the rate of profile extrusion. The larger the nominal cross-section, the higher the temperature of the oil bath to effect a satisfactory cure.

To vary the properties of the resulting article, the fluid into which the product is extruded can have a molecular weight, and/or properties, which differ from the extender fluid in the Parts A and B which are the basis for the silicone gel material. Additionally, the heat transfer fluid can contain additives such as benzophenone, and the like, such that a final UV irradiation step will lightly skin the surface to create a less tacky material. Alternately, the tack of the final product may be altered by lightly coating it with a powdered substance, for example talc or powdered polytetrafluoroethylene, or the like.

The following specific Examples and Comparative Examples illustrate the benefits of the particularly preferred embodiments of the invention.

EXAMPLE 1

The following formulations were prepared:

| Part A | 54.92 wt % of 5000 cSt trimethylsiloxy-terminated polydimethylsiloxane |
| --- | --- |
| | 45.00 wt % of 80,000 cSt divinyl-terminated polydimethylsiloxane |
| | 0.083 wt % of Pt catalyst PC075 (United Chemical Technology, contains ~2 wt % platinum) |
| Part B | 55.0 wt % of 5000 cSt trimethylsiloxy-terminated polydimethylsiloxane |
| | 44.819 wt % of 80,000 cSt divinyl-terminated polydimethylsiloxane |
| | 0.181 wt % of tetrakis(dimethylsiloxy)silane |

A mixture of equal parts of A and B exhibits a viscosity of about 13,000 cSt.

Equal parts of parts A and B described above were mixed at room temperature and extruded through a 6 mm diameter die into hot silicone oil (50 cSt trimethylsiloxy-terminated polydimethylsiloxane) at 135° C. The residence time of the extrudate in the heating bath was approximately 10 seconds. The speed of the extrusion was 30 cm/sec and the resulting profile had a uniform 6 mm diameter. The extruded gel profile had a VPH=47.5 g, VPT =23.6 g, VPSR=32%, and VPT/VPH of 0.49

EXAMPLE 2

A formulation containing:

| Part A | 54.92 wt % of 12,500 cSt trimethylsiloxy-terminated polydimethylsiloxane |
| --- | --- |
| | 45.00 wt % of 80,000 cSt divinyl-terminated polydimethylsiloxane |
| | 0.083 wt % of Pt catalyst PC075 |

| | -continued |
|---|---|
| Part B | 55.0 wt % of 12,500 cSt trimethylsiloxy-terminated poly-dimethylsiloxane |
| | 44.819 wt % of 80,000 cSt divinyl-terminated polydimethyl-siloxane |
| | 0.181 wt % of tetrakis(dimethylsiloxy)silane |

Equal parts of A and B were mixed at room temperature and extruded through a star shaped die (FIG. 3) into a silicone oil bath (50 cSt trimethylsiloxy-terminated polydimethylsiloxane) maintained at 135° C. The residence time of the extrudate in the oil bath was approximately 10 seconds and the speed of extrusion was approximately 25 cm/sec. The extruded profile had a square cross-section and possessed sharp corners and exhibited VPH of 79.1 g, VPT of 11 g, VPSR of 17% and a ratio of VPT/VPH of 0.14.

EXAMPLE 3

Formulation from Example 1 in U.S. Pat. No. 4,824,616 was prepared as follows:

| Part A | 30 parts of 1000 cSt dimethylvinylsiloxy-terminated poly-dimethylsiloxane (PS 443 Hüls America Inc.) |
|---|---|
| | 70 parts of 1000 cSt dimethylvinylsiloxy-terminated dimethyl-siloxane-methylvinylsiloxane copolymer (VDV-0131, Gelest, Inc.) |
| | 1.5 parts 5 cSt trimethylsiloxy-terminated methylhydrogen-polysiloxane (PS118, Hüls America Inc.) |
| Part B | 30 parts of 1000 cSt dimethylvinylsiloxy-terminated poly-dimethylpolysiloxane (PS 443 Hüls America Inc.). |
| | 70 parts of 1000 cSt dimethylvinylsiloxy-terminated dimethyl-siloxane-methylvinylsiloxane copolymer (VDV-0131, Gelest, Inc.). |
| | 0.6 part isopropanolic chloroplatinic acid (platinum metal content 3 wt %) |

Equal amounts of pads A and B (both at room temperature prior to mixing) were passed through a static mixer and thereafter through a 1:5 mm diameter die into a water bath at 80° C. Two runs were conducted. In one case the water contained 0.25 wt % Tergitol TMN-6 surfactant and in another it did not. In both runs the silicone mixture dispersed on the surface of the water and cured into irregularly shaped droplets. By contrast, when equal amounts of pads A and B (individually preheated to 90° C. prior to mixing), were passed through the static mixer and thereafter into hot silicone oil at 135° C. through 1.5 mm diameter die we obtained a continuous, regularly shaped profile with a diameter of 1.5 mm.

EXAMPLE 4

Equal amounts of pads A and B (as described in Example 1) were mixed in static mixer and extruded through die (diameter 6 mm) into poly(propylene glycol) average M.W. 1000, heated to 135° C. The extruded profile had uniform diameter and good appearance.

EXAMPLE 5

Parts A and B of Shin Etsu FE-56 fluorosilicone gel, were mixed with 2.25 wt % Cabosil HS-5 (a product of the Cabot Corporation) at room temperature. After waiting one hour, the semi-cured mixture was extruded through a 1 mm die into a heated silicone oil bath at 135° C. The extruded profile had a uniform 1 mm diameter cross-seCtion. The profile was kept in isopropyl alcohol for 2 months and retained its original shape, surface tack, and elongation.

EXAMPLE 6

The same formulation as in Example 2 was extruded into an aqueous bath at 85° C. (as taught in U.S. Pat. No. 5,124,090) using the same die. The extruded profile did not have a preferred square cross section and was irregular.

Comparative Example 1

An aqueous bath, containing surfactant, was prepared as described in U.S. Pat. No. 5,124,090. Tergitol TMN-6 surfactant (0.0025 kg) was mixed with water (0.9975 kg). The resulting solution was poured into a shallow container and was heated to 85° C.

Cadridges of a hand-held static mixer were filled with pads A and B of Sylgard 527 (viscosity 380 cps @ 25° C.). Both gel precursors were at room. temperature.

Equal amounts of pads A and B were mixed in the static mixer and extruded into the heated surfactant solution prepared above. The extruded material floated on the surface of the aqueous bath and readily dispersed. Later, the dispersed mixture cured into irregularly-shaped droplets. Because of the initial low viscosity of the mixture, we were unable to extrude a continuous, regularly-shaped profile.

Comparative Example 2

Using GE 6186 (viscosity 750 cps @ 25° C. after mixing) we repeated the procedure outlined in Comparative Example 1. The result of this experiment was identical to that observed in Comparative Example 1. Again, it was impossible to form a continuous, regularly-shaped profile.

Comparative Example 3

GE RTV 6186 gel and Sylgard 527 gel were also extruded into the hot silicone oil bath (140° C.). As in Comparative Examples 1 and 2, the mixed gel precursors dispersed upon contact with the silicone fluid. Again, it was not possible to extrude a continuous profile.

The invention has been described with respect to particularly preferred embodiments, and modifications which would be obvious to one of ordinary skill in the art are contemplated to be within scope of the invention. For example the extrusion into the bath can be done vertically as opposed to the horizontal illustration. In addition, the invention includes all heat transfer fluids which permit curing of the silicone gel materials.

What is claimed is:

1. A method of fabricating an extruded silicone gel profile made of cured silicone gel material, comprising the steps of:

(i) mixing to homogeneity a reactive silicone mixture which undergoes a cure at a temperature greater than about 35° C. to form cured silicone gel material, the mixing being conducted at a temperature below that at which the reactive silicone mixture readily cures in a static mixer, the reactive silicone mixture comprising a mixture of (a) a first silicone component which is $(R^1R^2_2SiO_{0.5})(R^1R^2SiO)_a(R^2_2SiO)_b(R^1R^2_2SiO_{0.5})$, $(R^2_3SiO_{0.5})(R^1R^2SiO)_c(R^2_2SiO)_d(R^2_3SiO_{0.5})$, or combinations thereof;

in which $R^1$ is selected from the group consisting of vinyl, allyl, and hexenyl and combinations thereof; and $R^2$ is selected from the group consisting of methyl, ethyl, higher alkyl, 3,3,3-trifluoropropyl, phenyl, and combinations thereof; and (b) a second silicone component which is $(R^3R^2_2SiO_{0.5})(R^3R^2SiO)_e(R^2_2SiO)_f(R^3R^2_2SiO_{0.5})$, $(R^2_3SiO_{0.5})(R^3R^2SiO)_g(R^2_2SiO)_h(R^2_3SiO_{0.5})$, $(R^3R^2_2SiO_{0.5})_4SiO_2$, or combinations thereof, in which $R^3$ is hydrogen and $R^2$ is as defined above;

the subscripts a–h being such that the cured silicone gel material, with or without the addition of an extender fluid, exhibits a Voland hardness of 6–225 grams, a Voland tack of about 1–75 grams and a Voland stress relaxation of about 10–95%;

(ii) passing the reactive silicone mixture through a shaped dye; and (iii) extruding the reactive silicone mixture through the shaped dye into a heated fluid bath, wherein the fluid is heated to a temperature greater than about 85° C., to form an extruded silicone gel profile made of cured silicone gel material, substantially having the shape of the dye.

2. A method according to claim 1, wherein the first silicone component is a multiply vinyl-functionalized poly(dimethylsiloxane) having a viscosity between about 10,000 and 500,000 cSt at 25° C. and the second silicone component has a molecular weight between about 300 and about 60,000 and has about 3 to about 20 reactive hydride sites per molecule.

3. A method according to claim 1, wherein the shaped die has a shape selected from the group consisting of a circle and an n-sided figure where n is an integer greater than 2.

4. A method according to claim 1, wherein the shaped die has a shape selected from the group consisting of a circle, a triangle, a square, a cusped square, and a rectangle.

5. A method according to claim 1, wherein the mixing in step (i) occurs at a temperature above about 15° C.

6. A method according to claim 1, wherein the fluid in the heated fluid bath has a boiling point above 85° C.

7. A method according to claim 6, wherein the fluid is selected from the group consisting of water, water containing a surfactant, glycerol, poly(alkylene glycol), mineral oil, silicone off, and combinations thereof.

8. A method according to claim 1, wherein the fluid in the heated fluid bath is caused to flow in the same direction as the extrusion direction of the extruded silicone gel profile.

9. A method according to claim 1, wherein the heated fluid bath is heated to a temperature greater than about 135° C.

10. A method according to claim 1, wherein the viscosity of the reactive silicone mixture at the extrusion head is greater than about 2,000 cSt at 25° C.

11. A method according to claim 1, wherein the fluid in the heated fluid bath is silicone oil and the silicone oil is absorbed into the extruded silicone gel profile.

12. A method according to claim 11, wherein the extruded silicone gel profile has a surface tack of greater than about 2 grams upon absorption of the silicone oil and has a ratio of Voland profile tack to Voland profile hardness of from about 0.05 to about 0.8.

13. A method according to claim 12, wherein the shaped die has a shape selected from the group consisting of a circle and an n-sided figure where n is an integer greater than 2.

14. A method according to claim 12, wherein the shaped die has a shape selected from the group consisting of a circle, a triangle, a square, a cusped square, and a rectangle.

15. A method according to claim 11, wherein the silicone oil is at a temperature between about 100° C. and about 250° C.

16. A method according to claim 11, wherein the silicone oil has a viscosity between about 25 and about 10,000 cSt at 25° C.

17. A method according to claim 16, wherein the silicone oil has a viscosity between about 50 and about 1,000 cSt at 25° C.

18. A method according to claim 1, wherein a carrier for the cured silicone gel material, in the form of a substantially non-elongatable core member, is passed through the shaped die during the extruding step.

19. A method according to claim 18, wherein the substantially non-elongatable core member is selected from the group consisting of polymer fibers, glass fibers, carbon fibers, metallic fibers, ceramic fibers, open cell foams, and combinations thereof.

20. A method according to claim 1, wherein the reactive silicone mixture further includes an extender fluid.

21. A method according to claim 20, wherein the extender fluid is trimethylsiloxy-terminated poly(dimethylsiloxane), in an amount of from 0 to 90 wt %.

22. A method according to claim 21, wherein the fluid in the heated fluid bath has a boiling point above 85° C.

23. A method according to claim 22, wherein the fluid is selected from the group consisting of water, water containing a surfactant, glycerol, poly(alkylene glycol), mineral oil, silicone oil, and combinations thereof.

24. A method according to claim 20, wherein the viscosity of the reactive silicone mixture at the extrusion head is greater than about 2,000 cSt at 25° C.

25. A method according to claim 20, wherein the fluid in the heated fluid bath is silicone oil and the silicone oil is absorbed into the extruded silicone gel profile.

26. An extruded silicone gel profile, made by the method of claim 1.

27. An extruded silicone gel profile according to claim 26, having a cross-sectional shape selected from the group consisting of a circle and an n-sided figure where n is an integer greater than 2.

28. An extruded silicone gel profile according to claim 26, having a cross-sectional shape selected from the group consisting of a circle, a triangle, a square, a cusped square, and a rectangle.

29. An extruded silicone gel profile according to claim 26, further including a carrier for the cured silicone gel material, in the form of a substantially non-elongatable core member.

30. An extruded silicone gel profile according to claim 29, wherein the substantially non-elongatable core member is selected from the group consisting of polymer fibers, glass fibers, carbon fibers, metallic fibers, ceramic fibers, open cell foams, and combinations thereof.

31. An extruded silicone gel profile according to claim 26, which has absorbed silicone oil from the heated fluid bath thereinto.

32. An extruded silicone gel profile according to claim 31, having a surface tack of greater than about 2 grams upon absorption of the silicone oil and has a ratio of Voland profile tack to Voland profile hardness of from about 0.05 to about 0.8.

* * * * *

UNITED STATES PATENT AND TRADEMARK OFFICE
CERTIFICATE OF CORRECTION

PATENT NO. : 5,665,809
DATED : September 9, 1997
INVENTOR(S) : Wojtowicz, Janusz It is certified that error appears in the above-identified patent and that said Letters Patent is hereby corrected as shown below:

Column 9, line 35, delete "pads" and replace with --parts--.

Column 9, line 42, delete "pad" and replace with --parts--.

Column 9, line 49, delete "pad" and replace with --parts--.

Column 10, line 11, delete "pad" and replace with --parts--.

Column 11, line 34, (Claim 7, line 4) delete "off" and replace with --oil--.

Signed and Sealed this

Twenty-sixth Day of May, 1998

Attest:

BRUCE LEHMAN

Attesting Officer

Commissioner of Patents and Trademarks